United States Patent [19]

Hahn et al.

[11] 4,175,142
[45] Nov. 20, 1979

[54] PROCESS FOR THE PRODUCTION OF STERILIZED MAYONNAISE OR MAYONNAISE-CONTAINING PRODUCTS

[75] Inventors: Carl-Georg Hahn, Lübeck; Kurt Rippel, Bad Schwartau, both of Fed. Rep. of Germany

[73] Assignee: Schroeder & Co., Fed. Rep. of Germany

[21] Appl. No.: 814,026

[22] Filed: Jul. 8, 1977

[30] Foreign Application Priority Data

Jul. 9, 1976 [DE] Fed. Rep. of Germany ....... 2630872

[51] Int. Cl.² .......................... A23D 5/02; A23D 5/03
[52] U.S. Cl. ..................................... 426/605; 426/613
[58] Field of Search ................................ 426/605, 613

[56] References Cited

U.S. PATENT DOCUMENTS

| | | | |
|---|---|---|---|
| 2,844,469 | 7/1958 | Melnick et al. | 426/605 X |
| 2,844,470 | 7/1958 | Akerboom et al. | 426/605 X |
| 3,093,485 | 6/1963 | Partyka | 426/605 |
| 3,804,957 | 4/1974 | Purves | 426/605 |

*Primary Examiner*—Robert A. Yoncoskie
*Attorney, Agent, or Firm*—McGlew and Tuttle

[57] ABSTRACT

A method of producing sterilized or pasteurized mayonnaise or mayonnaise-containing products, comprises directing coagulated egg yellow, such as powdered egg yolk and milk protein, such as powdered skim milk, proteins, starch and stabilizers into a container in which they are mixed together, and adding salt and a small amount of oil and colorants. The mixture is then directed through a dosing pump to a first heater in which the mixture is briefly heated to a temperature in the range of from about 80° C. to 100° C. The heated mixture is subsequently cooled in a first heater to room temperature. The cooled material is then emulsified with oil in an emulsifier. The emulsion is then stirred with vinegar and other additives to form a mayonnaise. The mayonnaise is pasteurized by heating it briefly in a second heater to about 80° to 100° C., or it is sterilized by heating it to a higher temperature of from 110° to 130° C. Thereafter, the pasteurized mayonnaise is cooled in a second cooler and it is continuously filled into sterilized containers.

11 Claims, 1 Drawing Figure

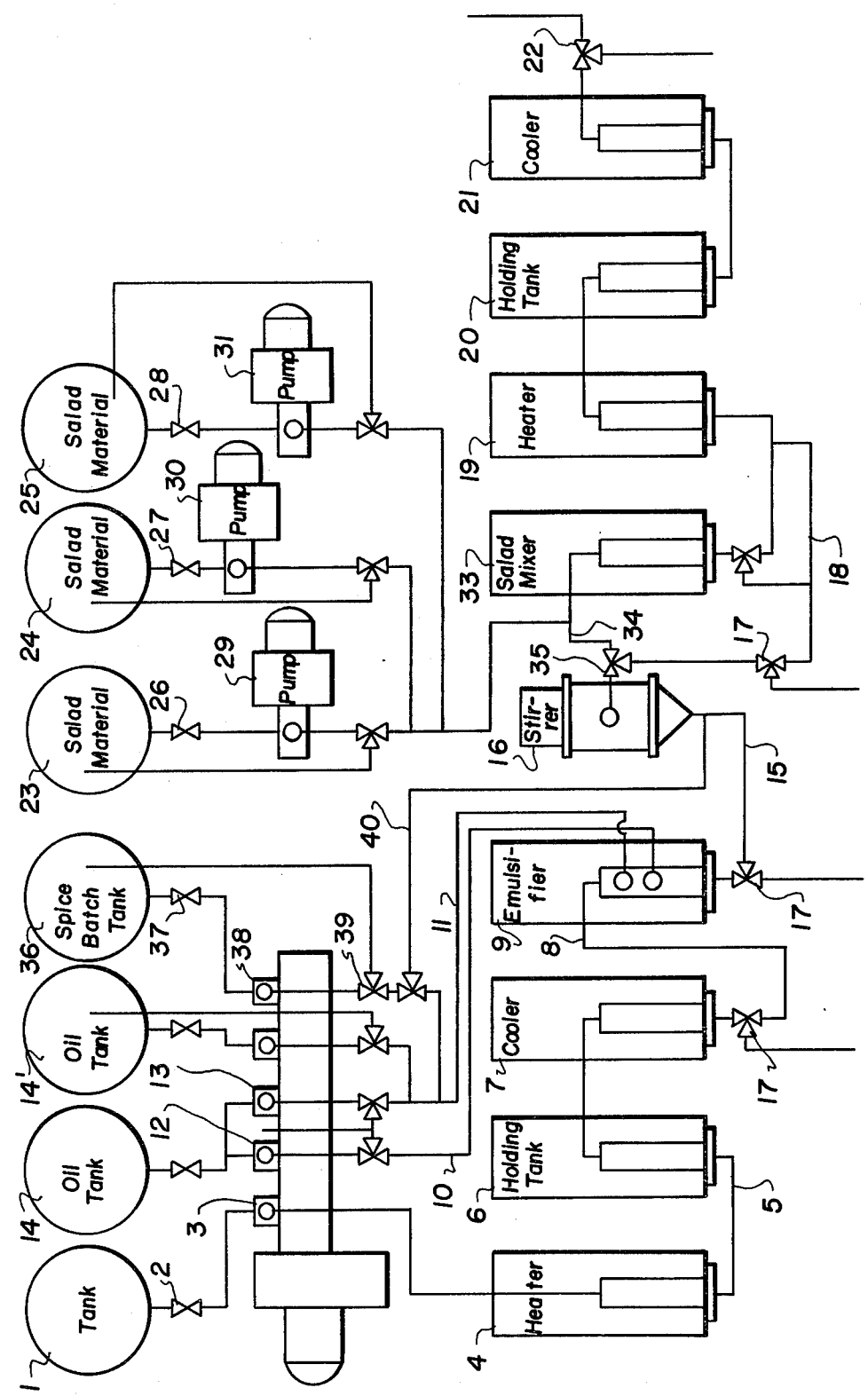

PROCESS FOR THE PRODUCTION OF STERILIZED MAYONNAISE OR MAYONNAISE-CONTAINING PRODUCTS

FIELD AND BACKGROUND OF THE INVENTION

This invention relates in general to a process for manufacturing mayonnaise and, in particular, to a process for the continuous production of sterilized mayonnaise and/or mayonnaise-containing products, in which the ingredients of the mayonnaise are pasteurized and conducted through an emulsifier.

DESCRIPTION OF THE PRIOR ART

A process for the production of sterilized mayonnaise by heating is known, in which vinegar, with salt and spices added and eggs, are pasteurized and subsequently introduced into an emulsifier for the formation of mayonnaise. The oil, whether pasteurized or not, is likewise added in a steady flow to the egg-liquid current before it enters the emulsifier. The oil can be added in a steady flow to the pasteurized and cooled egg-liquid current before it enters the emulsifier, preferably, in a special mixer. Furthermore, the ingredients vinegar, with the added salt and spices, the oil and egg, can be fed in a steady flow to a pasteurizer and subsequently to a cooling device where they arrive in the emulsifier and then in the colloid rotor. If a starch-containing mayonnaise is to be produced, it is also known to pasteurize the starch in a steady flow and then to cool it, after which it is fed continuously to the emulsifier, preferably to the mayonnaise current leaving the emulsifier before it enters the colloid rotor. It was not possible with this process, however, to produce a stable mayonnaise.

SUMMARY OF THE INVENTION

The present invention provides pasteurized mayonnaise or pasteurized mayonnaise-containing products which are stable over a long period of time, do not require storage under refrigeration, and the process can be carried out simply in a continuous flow. In addition, the use of preservatives can be avoided. The invention produces sterilized products of the aforementioned type.

The invention provides a process wherein coagulated egg yolk, such as powdered egg yolk and milk protein, powdered skim milk, proteins, starch and stabilizers are thoroughly mixed, salt, oil and colorants are added, and the resultant mixture is fed by a dosing pump to a heater in which the material is heated briefly to a temperature of from about 80° C. to 100° C. for a time sufficient to pasteurize the mixture. The heated mixture is subsequently cooled in a cooling device to room temperature or below room temperature, after which, the cooled material is emulsified with oil in an emulsifier. Subsequently, the emulsified mixture is further mixed in an intensive stirrer with further additions, if necessary, after which the mayonnaise thus formed is pasteurized in a heater at about 80° C. to 100° C. and is then cooled again in a cooling device and, thereafter, the fully sterilized material is filled continuously into containers. Surprisingly, a mayonnaise of proper consistency can be produced and pasteurized in this way so that it is stable over long periods of time, even without refrigeration. Another advantage is that the use of preservatives is substantially eliminated.

The process according to the invention can also be used in an advantageous manner, not only for mayonnaise, but also for mayonnaise-containing products, for example, salads, particularly meat salads, vegetable salads, fruit salads, fish salads, crab salads, etc., which are to be prepared. In this case, the prepared salads or salad sauces are fed to a closed mixer which is arranged between the intensive stirrer and the second heater. If the mayonnaise or the mayonnaise-containing products are to be sterilized, the process can be so carried out that the heating is effected briefly in the last stage in the range of from about 110° C. to 130° C.

According to another feature of the invention, the material leaving the first heater can be kept for a certain time, up to several minutes, at a constant temperature without mechanical treatment, before it enters the cooler. Keeping the material at elevated temperature for a certain time has the advantage that all ingredients of the material will positively attain the respective temperature. The duration of the holding period depends on the circumstances. The material leaving the second heater can be treated in the same way to achieve the same advantages.

According to another feature of the invention, the material leaving the last cooler can be cooled to a temperature of from about 5° to 20° C. before it is filled into containers, in order to avoid the formation of water or condensation.

In order to carry out the process according to the invention, a heater where the material to be heated is scraped off continuously from the heated wall of the heater can be used. A dosing rotary slide piston pump can be used for the continuous supply of the salad ingredients. This has the advantage that the consistency of the salad ingredients is not impaired.

Accordingly, an object of the invention is to provide a method and apparatus for making mayonnaise, the method including mixing together egg yolks, milk proteins, stabilizer and water together with any necessary salt and colorants, heating the mixture in the range of from about 80° C. to 100° C. for from a few seconds up to a few minutes, cooling the heated mixture to form an initial cool mixture, emulsifying the cooled mixture with oil to form an emulsion, adding spices to the emulsion to form a mayonnaise and heating the mayonnaise to a temperature in the range of from 80° C. to 100° C. to form a pasteurized substance, and to a temperature in the range of from 110° C. to 130° C. to form a sterilized substance, and directing the pasteurized mayonnaise substance to a holding tank for controlling the temperature for up to several minutes and, thereafter, cooling the material and filling the material directly into sterilized containers.

A further object of the invention is to provide an apparatus for forming mayonnaise and particularly sterilized mayonnaise or mayonnaise-containing products which is simple in design, rugged in construction, and economical to manufacture.

The various features of novelty which characterize the invention are pointed out with particularity in the claims annexed to and forming a part of this disclosure. For a better understanding of the invention, its operating advantages and specific objects attained by its uses, reference should be had to the accompanying drawing and descriptive matter in which there is illustrated a preferred embodiment of the invention.

BRIEF DESCRIPTION OF THE DRAWING

The only FIGURE of the drawing is a schematic representation of an apparatus for continuously forming mayonnaise constructed in accordance with the invention.

DESCRIPTION OF THE PREFERRED EMBODIMENT

Referring to the drawing in particular, the invention embodied therein, comprises a device for continuously forming a mayonnaise which may be instantly discharged after forming into a sterilized container in a process which would ensure the complete sterilization or pasteurization of the mayonnaise material.

In accordance with the invention, a container 1 is filled with a coagulated egg yolk, e.g., powdered egg yolk, milk protein, e.g., powdered milk, some soybean oil, a small amount of starch, stabilizer and water, and salt and colorants may be added, if desired. These substances are mixed thoroughly and flow through a shut-off valve 2 and a dosing pump 3 to a heater 4. The heater 4 is advantageously a tubular heater, in which a rotary stirrer shaft (not shown) is provided to prevent the deposit of material in the interior. This shaft is equipped with scrapers which slide along the walls and remove the material from the wall. The material is heated in the heater to a temperature of from about 80° C. to 100° C. The heating time can be one or several seconds. The material leaves the heater through a pipe line 5 and is conducted to a holding device 6 which consists of a pipe whose length is determined by the desired stay period. The pipe can be so dimensioned that the material is kept for several seconds or even minutes at the temperature with which it leaves the heater.

The material issuing from holding device 6 flows into a cooler 7 where it is cooled to temperatures, such as room temperature. The material flows from the cooler through a line 8 into emulsifier 9. Oil tank 14 and standby oil tank 14' are connected to the latter over the feed lines 10 and 11 and dosing pumps 12 and 13. The use of two dosing pumps 12 and 13 and two lines 10 and 11 has the advantage of improving the addition and dosing of the oil at several points of emulsifying cylinder 9. Thus, the emulsification is facilitated. The material flows through line 15 from the emulsifier to an intensive stirrer 16 which can be designed similar to a colloid rotor. Three-way valves 17 for taking samples can also be connected to the lines.

The spice batch consisting of vinegar, mustard, sugar and various spices is mixed in a vessel 36 and stirred thoroughly by means of a stirrer. The spice batch is conducted over a shut-off valve 37, a dosing pump 38, two three-way valves 39, and a line 40 into line 15, and is thus added to the current of the mixture issuing from emulsifying cylinder 9 before it enters the intensive stirrer 16.

A line 18 leads from the intensive stirrer 16 to another heater 19, in which the mass formed is heated briefly to a temperature of from about 80° C. to 100° C. for pasteurization or to a higher temperature, for example, of from about 110° C. to 130° C., for sterilization. Heater 19 can be designed in the same manner as heater 4.

The material flows from heater 19 into a second holding device 20, which is designed in the same manner as holding device 6. The material can be kept here for several seconds or several minutes at a constant or substantially constant temperature. The two holding devices are provided to ensure uniform heating of all ingredients of the material.

The holding pipes can be provided with either an insulation or with a double jacket for heating by means of hot water to ensure proper temperature control. The material flows into cooler 21 from holding tank 20 where it is cooled to room temperature, or even lower temperatures. Cooling to lower temperatures has the advantage that the formation of water or condensation before filling into the containers is avoided. The material flows over multiway valve 22 to the filling station, which is kept sterilized.

The above-described apparatus is sealed in a manner such that germs cannot get into the material. Storage and sealing of the last cooler, which can be designed in the same manner as the heater, are germproof, so that the above-described process is carried out under complete exclusion of air and there is no possibility for germs to penetrate the apparatus.

If the above-described means are to be used for the production of a mayonnaise-containing product, such as a mayonnaise-containing salad, a salad batch is prepared in the containers 23, 24, 25 or similar containers. The material flows over shut-off valves 26, 27 and 28 from the containers to the dosing rotary valve piston pumps 29, 30 and 31, and from there, through the lines to the mixer 33, to the feed pipe 34 of which the intensive stirrer 16 is connected by a valve 35. In this process, the mayonnaise leaving the intensive stirrer 16 is mixed uniformly and gently with the salad batches in mixer 33 without destroying the salad parts. An apparatus which does not impair the consistency of the salad ingredients should be selected as a mixer.

The material is introduced from the mixer into the heater 19 and then passes through the additional operating stages as described above. Heater 19 and cooler 21 are designed in the same manner as the mixer, so that the consistency of the salad ingredients is not impaired.

The material passes in a continuous flow through the entire arrangement under complete exclusion of air in this procedure also, so that an infection by germs is impossible.

While a specific embodiment of the invention has been shown and described in detail to illustrate the application of the principles of the invention, it will be understood that the invention may be embodied otherwise without departing from such principles.

What is claimed is:

1. A process for the production of a pasteurized or sterilized mayonnaise or mayonnaise containing product comprising
   (a) mixing coagulated egg yolk, milk protein, starch, a stabilizer, a minor amount of oil and water to form a basic mixture;
   (b) heating the basic mixture in a first heater in a temperature range of about 80° C. to 100° C. for a time sufficient to pasteurize said basic mixture;
   (c) cooling the pasteurized mixture in a first cooler to at least room temperature;
   (d) emulsifying the cooled mixture with additional oil to form an emulsion, said combined oil added in steps (a) and (d) being sufficient for preparing said product;
   (e) adding with stirring ingredients comprising vinegar and spices to the emulsion to form mayonnaise or mayonnaise containing product;

(f) heating said formed product in a second heater at a temperature in the range of about 80° C. to 100° C. for a time sufficient to pasteurize said product or at a temperature in the range of about 110° C. to 130° C. for a time sufficient to sterilize said product, and (g) cooling the pasteurized or sterilized product in a second cooler to a temperature of from about 5° to 20° C.

2. Process according to claim 1, wherein the mixture of step (a) additionally contains salt and coloring matter.

3. A process according to claim 1, wherein the coagulated egg yolk is powdered egg yolk.

4. A process according to claim 1, wherein the milk protein is skim milk powder.

5. A process according to claim 1, wherein the mixture is heated to a temperature of from 110° to 130° C. in step (f).

6. A process according to claim 1, wherein during the carrying out of step (b), the material is continuously scraped from the wall of the heater.

7. A process according to claim 1, including providing a dosing rotary valve pump and using the pump for the continuous supply of the salad ingredients.

8. A process according to claim 1, including keeping material after it is pasteurized in step (b) at an elevated temperature without mechanical treatment for a time sufficient for all ingredients to attain the respective elevated temperature before it is subjected to step (c).

9. A process according to claim 1, wherein after said product is formed in step (f), it is kept at an elevated temperature without mechanical treatment for a time sufficient for all ingredients to attain the respective elevated temperature before it is subjected to step (g).

10. In a method of making mayonnaise in which egg yolk, milk protein, a stabilizer and water are mixed together to form a mixture, the improvement comprising heating the mixture in the range of 80° C. to 100° C. for a period of time sufficient to pasteurize said mixture, cooling the pasteurized mixture to about room temperature to form an initial cool mixture, emulsifying oil with the cool mixture to form an emulsion, adding spices to the emulsion to form a mayonnaise, heating the mayonnaise to a temperature range of from 80° C. to 100° C. or from 110° C. to 130° C. for a time sufficient to pasteurize or sterilize said mayonnaise, respectively, and directing the pasteurized or sterilized mayonnaise into a sterilized container.

11. A method of making mayonnaise, according to claim 10, wherein the heating is carried out in the temperature range of from 110° C. to 130° C., and the sterilized mayonnaise is directed to a holding tank for a time sufficient to stabilize its temperature and thereafter the held mayonnaise is directed into a sterilized container.

* * * * *